United States Patent
Futakata et al.

(10) Patent No.: US 7,035,660 B2
(45) Date of Patent: Apr. 25, 2006

(54) MOBILE COMMUNICATION SYSTEM, BASE STATION APPARATUS, AND METHOD OF CONTROLLING MOBILE COMMUNICATION SYSTEM

(75) Inventors: Toshiyuki Futakata, Chiyoda-ku (JP); Sung Uk Moon, Chiyoda-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 358 days.

(21) Appl. No.: 10/201,305

(22) Filed: Jul. 24, 2002

(65) Prior Publication Data

US 2003/0027588 A1    Feb. 6, 2003

(30) Foreign Application Priority Data

Jul. 31, 2001    (JP)    ............................. 2001-232767

(51) Int. Cl.
*H04B 7/00*    (2006.01)

(52) U.S. Cl. ...................... 455/522; 455/69; 455/452.2

(58) Field of Classification Search ................ 455/450, 455/452.1, 452.2, 455, 522, 500, 501, 527, 455/69, 561, 453; 370/320, 329, 332, 335, 370/342, 31

See application file for complete search history.

(56) References Cited

U.S. PATENT DOCUMENTS

| | | | |
|---|---|---|---|
| 5,448,750 A | | 9/1995 | Eriksson et al. |
| 6,493,331 B1 * | 12/2002 | Walton et al. | ............... 370/341 |
| 6,535,503 B1 * | 3/2003 | Toskala et al. | ............. 370/349 |
| 6,738,623 B1 * | 5/2004 | Oh et al. | ..................... 455/450 |
| 6,775,541 B1 * | 8/2004 | Dillon et al. | ............ 455/422.1 |
| 2004/0002353 A1 * | 1/2004 | Frantti | ......................... 455/522 |
| 2004/0132405 A1 * | 7/2004 | Kitazawa et al. | .......... 455/13.4 |

FOREIGN PATENT DOCUMENTS

| | | |
|---|---|---|
| EP | 0631397 | 12/1994 |
| EP | 0936753 | 8/1999 |
| EP | 1061680 | 12/2000 |
| EP | 1225710 | 7/2002 |
| WO | 01/76098 | 10/2001 |

\* cited by examiner

*Primary Examiner*—Edan Orgad
(74) *Attorney, Agent, or Firm*—Crowell & Moring LLP

(57) ABSTRACT

In a mobile communication system, interference power from adjacent cells is effectively reduced and transmission power is limited. A transmission loss estimation unit 202 and a transmission power estimation unit 204 estimate transmission power necessary for transmission of a downstream signal. According to an upstream signal from each of plurality of mobile terminal devices to a base station, a grouping unit 206 divides a plurality of mobile terminal devices into groups sharing a plurality of wireless resources according to the estimated transmission powers. Downstream signals to be transmitted to mobile terminal devices belonging to each of the groups formed by the grouping means are transmitted simultaneously with each other. Also, priorities are set for the plurality of wireless resources and the mobile terminal devices belonging to the groups divided by the grouping unit 206 are assigned according to the set priorities. Accordingly, transmission to one of the groups requiring higher transmission power in one of cells adjacent to each other and transmission to one of the groups requiring higher transmission power in another of the cells are performed at different times, thereby reducing interference power received in each cell from the adjacent cells.

15 Claims, 5 Drawing Sheets

|  |  | SHARED CHANNEL SC1 |  | SHARED CHANNEL SC2 |  | SHARED CHANNEL SC3 |  |
|---|---|---|---|---|---|---|---|
| BASE STATION A |  | PRIORITY1 |  | PRIORITY2 |  | PRIORITY3 |  |
| BASE STATION B |  | PRIORITY3 |  | PRIORITY1 |  | PRIORITY2 |  |
| BASE STATION C |  | PRIORITY2 |  | PRIORITY3 |  | PRIORITY1 |  |

MOBILE COMMUNICATION SYSTEM, BASE STATION APPARATUS, AND METHOD OF CONTROLLING MOBILE COMMUNICATION SYSTEM

BACKGROUND OF THE INVENTION

1. Field of the Invention

The present invention relates to a mobile communication system, a base station apparatus and a method of controlling the mobile communication system, and, more particularly, to a mobile communication system in which a combination of three methods: code division multiple access (CDMA), time division multiple access (TDMA) and time division duplex (TDD) is used as an access method, and in which communication is performed by using one frequency in two cells adjacent to each other or a frequency with a possibility of interference, a base station apparatus adapted to the mobile communication system and a method of controlling the mobile communication system.

2. Description of the Related Art

In a CDMA system, a wireless resource called a shared channel is defined. This shared channel is used mainly for packet users in such a manner that one channel is shared by a plurality of users. Over this shared channel, transmission is performed at different times in correspondence with the users and call setting control can be easily performed. However, there is a need for scheduling for determining which user is allowed to use the resource.

FIG. 9 shows an example of a frame configuration of a CDMA/TDMA/TDD method. In the example shown in FIG. 9, one frame is constituted by fifteen time slots, and eight codes at the maximum can be multiplexed. In the CDMA/TDMA/TDD method used as a wireless access method, wireless resource assignment with respect to a traffic will be as described below.

(1) The TDD method is one of methods in which a downstream channel and an upstream channel are separated, and in which use of one frequency is divided with respect to time. According to the TDD method, therefore, the fifteen time slots are allotted between upstream channels and downstream channels.

(2) The TDMA method is a multiple access method in which a time period for transmission of one frame using one frequency is divided into a certain number of time slots and users use different time slots assigned from the divided time slots. According to the TDMA method, therefore, one or more of fifteen time slots are assigned to one user.

(3) The CDMA method is a multiple access method in which wireless channels are set by using different codes in correspondence with users at one radio frequency. According to the CDMA method, therefore, user multiplexing is performed by using different codes for different users in each time slot.

FIG. 10 shows a concept of a shared channel with respect to a case where a shared channel held through a plurality of time slots is set in one frame. The shared channel is indicated by hatched portions in FIG. 10. Scheduling is performed for assignment of the resource to users with respect to data destined to the users. As a result of scheduling, the resource is assigned to different users in correspondence with frames. If the amount of information for a user is large, the same user may use the resource over a time period corresponding to a plurality of frames.

A CDMA system operates normally under a condition including interference and ordinarily uses transmission power control such that transmission power is increased to maintain transmission quality when the amount of interference is increased. This transmission power control is instantaneously performed to compensate for a change in reception level or a delay of transmission from a base station due to multipath fading. Interference power is generally divided into two kinds: that is, interference from other users in one cell, and interference from the outside of the cell or interference from other systems.

In a high-speed data communication (at a rate of 128 kbps or higher according to current specifications) over the above-described shared channel, the whole of one time slot or more is used for only one user. In such a high-speed communication, therefore, the above-described in-cell interference can be ignored and out-of-cell interference is dominant.

As described above, in a case where a combination of a CDMA method, a TDMA method and a TDD method is used as a wireless access method, interference power which influences the capacity for a user in a cell when the whole of one slot or more is used only for the user is only interference power form the outside of the cell. Interference power from an adjacent cell depends on power required for users in the adjacent cell and the locations of the users in the adjacent cell. Therefore, if the amount of interference from the adjacent cell is large, there is a need to increase the transmission power. Disadvantageously, the communication quality is reduced when the maximum transmission power is reached.

Further, CDMA/TDMA/TDD systems in which transmission power control is not performed have a drawback of reducing the communication quality when the amount of interference is large.

SUMMARY OF THE INVENTION

In view of the above-described drawbacks of the conventional art, an object of the present invention is to provide a mobile communication system in which interference power from adjacent cells can be effectively reduced, and in which the transmission power can be limited, a base station apparatus, and a method of controlling the mobile communication system.

To attain the above-described object, according to claim 1 of the present invention, there is provided a mobile communication system including: transmission power estimation means for estimating transmission power necessary for transmission of a downstream signal from a base station apparatus to each of a plurality of mobile terminal devices on the basis of an upstream signal from the mobile terminal device to the base station apparatus; and grouping means for performing grouping processing for dividing the plurality of mobile terminal devices into groups sharing one or more wireless resources according to the transmission powers estimated by the transmission power estimation means, in which the downstream signals to be transmitted to the mobile terminal devices belonging to each of the groups divided by the grouping means are transmitted simultaneously with each other.

According to a mobile communication system as set forth in claim 2, in claim 1 the transmission power estimation means receives signals transmitted at a known transmission power by the mobile terminal devices, measure transmission losses between the mobile terminal devices and the base station apparatus on the basis of the received signals, and estimate the transmission power necessary for transmission of the downstream signal to each mobile terminal device on the basis of the transmission loss and the kind of service offered.

According to a mobile communication system as set forth in claim 3, in claim 1 or claim 2 there is further included a priority setting means for setting priorities for one or more wireless resources. The mobile terminal devices belonging to the groups divided by the grouping means are assigned according to the priorities set by the priority setting means.

According to a mobile communication system as set forth in claim 4, in claim 3 the priority setting means sets the priorities in accordance with an instruction from an external apparatus.

According to claim 5 of the present invention, there is provided a base station apparatus which performs transmission power control with respect to downstream signals respectively transmitted to a plurality of mobile terminal devices, the base station apparatus including transmission power estimation means for estimating transmission power necessary for transmission of a downstream signal to each of the mobile terminal devices on the basis of an upstream signal from the mobile terminal device, and grouping means for performing grouping processing for dividing the plurality of mobile terminal devices into groups sharing one or more wireless resources according to the transmission powers estimated by the transmission power estimation means, wherein the downstream signals to be transmitted to the mobile terminal devices belonging to each of the groups divided by the grouping means are transmitted simultaneously with each other.

According to a base station apparatus as set forth in claim 6, in claim 5 the transmission power estimation means receives signals transmitted at a known transmission power by the mobile terminal devices, measure transmission losses between the mobile terminal devices and the base station apparatus on the basis of the received signals, and estimate the transmission power necessary for transmission of the downstream signal to each mobile terminal device on the basis of the transmission loss and the kind of service offered.

According to a base station apparatus as set forth in claim 7, in claim 5 or claim 6 there is further included priority setting means for setting priorities for one or more wireless resources. The mobile terminal devices belonging to the groups divided by the grouping means are assigned according to the priorities set by the priority setting means.

According to a base station as set forth in claim 8, in claim 7 the priority setting means sets the priorities in accordance with an instruction from an external apparatus.

According to claim 9 of the present invention, there is provided a method of controlling a mobile communication system in which transmission power control is performed with respect to downstream signals respectively transmitted from a base station apparatus to a plurality of mobile terminal devices, the method including a transmission power estimation step of estimating transmission power necessary for transmission of the downstream signal to each mobile terminal device on the basis of an upstream signal from the mobile terminal device to the base station apparatus, and a grouping step of performing grouping processing for dividing the plurality of mobile terminal devices into groups sharing one or more wireless resources according to the transmission powers estimated in the transmission power estimation step, wherein the downstream signals to be transmitted to users belonging to each of the groups divided in the grouping step are transmitted simultaneously with each other.

According to a method of controlling a mobile communication system as set forth in claim 10, in claim 9 estimation of transmission power in the transmission power estimation step is performed in the base station apparatus, and grouping processing in the grouping step may be performed in a controller higher in level than the base station apparatus.

According to a method of controlling a mobile communication system as set forth in claim 11, in claim 9 or claim 10 the transmission power estimation step of the above-described method, the base station apparatus receives signals transmitted at a known transmission power by the mobile terminal devices, measure transmission losses between the mobile terminal devices and the base station apparatus on the basis of the received signals, and estimate the transmission power necessary for transmission of the downstream signal to each mobile terminal device on the basis of the transmission loss and the kind of service offered.

According to a method of controlling a mobile communication system as set forth in claim 12, in any one of claims 9 to 11, there is further included a priority setting step of respectively setting priorities for the one or more wireless resources. The mobile terminal devices belonging to the groups divided in the grouping step are assigned according to the priorities set in the priority setting step.

According to a method of controlling a mobile communication system as set forth in claim 13, in claim 12 in the priority setting step, the priorities are set in accordance with an instruction from an external apparatus.

In short, in this system, necessary transmission powers are estimated and one or more wireless resources (codes, time slots, frequency channels) assigned according to the transmission powers are differentiated between base station apparatuses. The base station apparatuses are respectively given priorities with which wireless resources are assigned according to the transmission power, and assign the wireless resources to users.

Control for setting priorities is automatically performed in each base station, or centralized control of the base station apparatuses may be performed by a higher-level controller to determine wireless resources to be assigned. Either method can be used. This system can be used in a case where a combination of a CDMA method, a TDMA method and a TDD method is used as a wireless access method.

As mentioned above, a shared channel in which one wireless resource (code, time slot, wireless frame) is used mainly for packet users in a time division manner is defined. This system can be used in a case where there is one or more wireless resources to be shared. Necessary transmission powers are estimated from upstream signals received by base station apparatuses or a higher-level controller. Grouping (classification) of users is performed on the basis of the necessary transmission powers to determine groups of users who share the wireless resources. The groups of users and the wireless resources to be assigned are differentiated between the base station apparatuses. This control may be performed as centralized control by the higher-level controller.

In a CDMA/TDMA/TDD system in which transmission power control is not performed, the transmission power with respect to time slots is set to different values. Also in this case the same effect can be expected if the above-described grouping is performed in correspondence with the transmission powers with respect to time slots.

If the present invention is applied to a CDMA/TDMA/TDD system in the above-described manner, interference power received in one cell from adjacent cells can be reduced. The received power for obtaining the required quality is thereby reduced. Consequently, the transmission power can be limited.

DETAILED DESCRIPTION OF THE PREFERRED EMBODIMENTS

Figure 1:
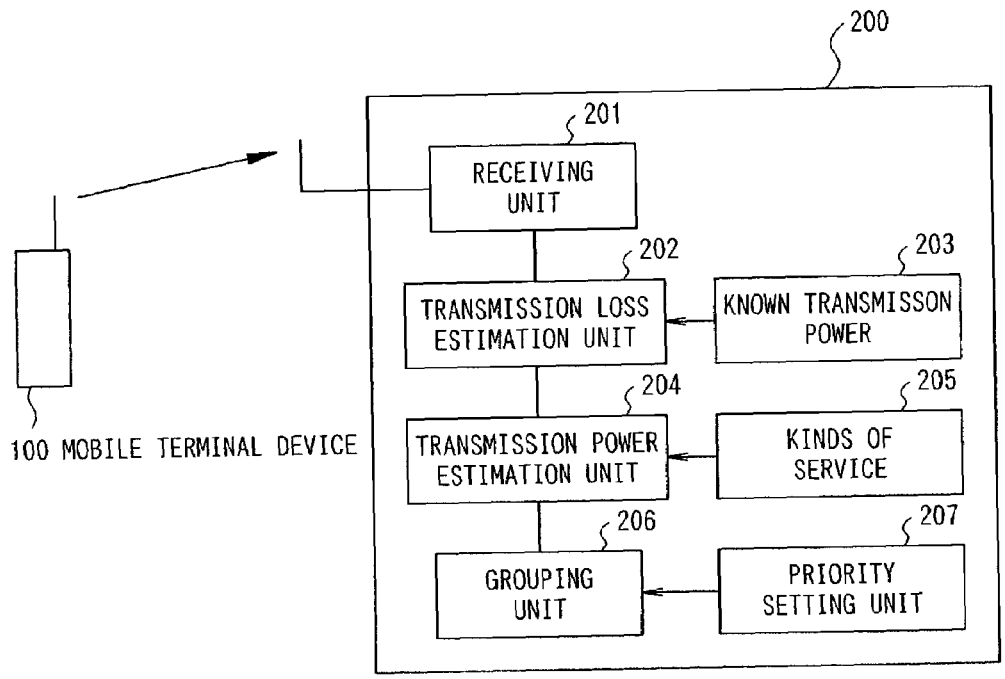
FIG. 1 is a diagram showing a configuration of a mobile communication system in an embodiment of the present invention.

Embodiments of the present invention will be described with reference to the accompanying drawings. In the drawings referred in the description below, components, etc., identical or corresponding to each other are indicated by the same reference characters.

(First Embodiment)

A first embodiment of the present invention will be described. A wireless access method in this embodiment is assumed to be a combination of three methods: a CDMA method, a TDMA method and a TDD method. The embodiment will be described with respect to a case where transmission power control of transmission over a downstream channel is performed.

Figure 9:
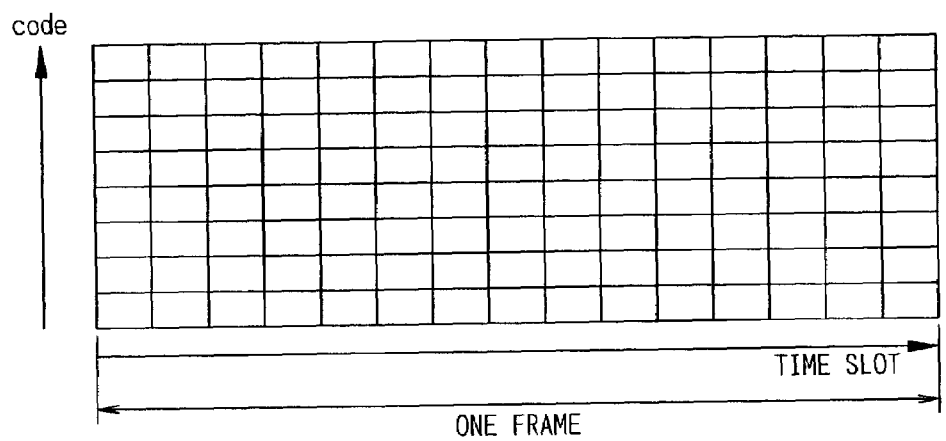
FIG. 9 is a diagram showing a frame configuration in a CDMA/TDMA/TDD method.
Figure 10:
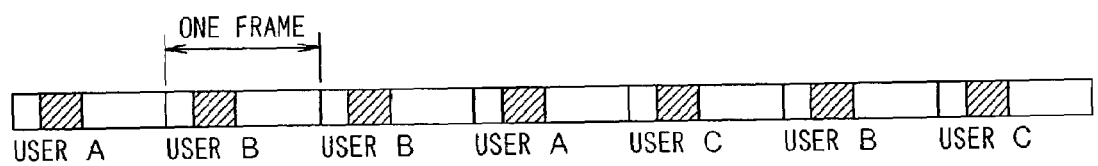
FIG. 10 is a diagram for explaining a concept of a shared channel in a CDMA/TDMA/TDD method.

A frame configuration, e.g., the one shown in FIG. 9 may be used in this embodiment. As mentioned above, FIG. 9 shows an example of a CDMA/TDMA/TDD method in which one frame is constituted by fifteen time slots, in which eight codes at the maximum can be multiplexed. Since the wireless access method in this embodiment is a combination of a CDMA method, a TDMA method, and a TDD method, wireless resource assignment with respect to a traffic is as described below.

(1) According to the TDD method, the fifteen time slots are allotted between upstream channels and downstream channels.

(2) According to the TDMA method, one time slot or a plurality of time slots are assigned with respect to a transmission rate.

(3) According to the CDMA method, user multiplexing is performed by using in each time slot different codes for different users according to transmission rates.

In the case of communication over the above-described shared channel or high-speed data communication of 128 kbps or higher, the whole of one time slot is used for only one user. Accordingly, interference waves influencing a signal to be communicated in a cell are considered to be only interference power from the outside of the cell.

When a base station receives a transmission request from a mobile terminal or from the network side, its ends and receives control information for establishing a link. At this time, the base station estimates transmission power necessary for transmission from it on the basis of a signal from the mobile terminal.

Figure 2:
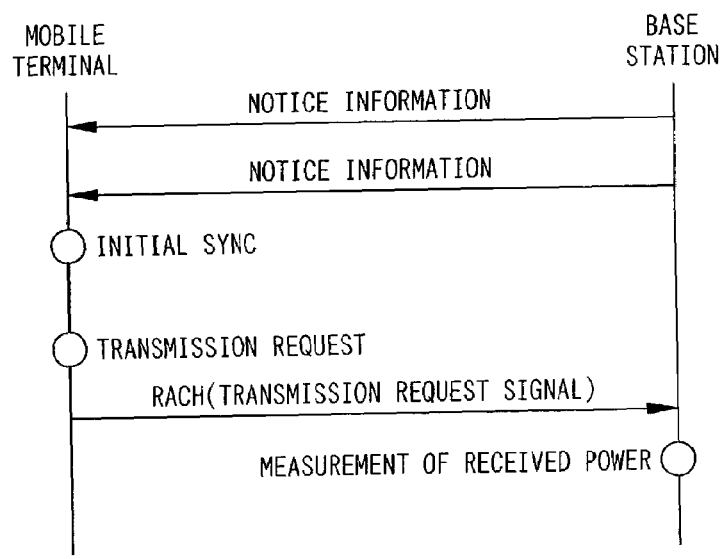
FIG. 2 is a diagrams showing an example of an ordinary transmission sequence.

FIG. 2 shows an example of an ordinary sequence of operations at the time of transmission. As shown in FIG. 2, when notice information is transmitted as a downstream signal from a wireless base station apparatus to a mobile terminal device, the mobile terminal device performs an initial sync operation and a transmission request operation. The mobile terminal device thereby transmits a transmission request signal (Random Access Channel, hereinafter referred to as RACH) as an upstream signal to the wireless base station apparatus. The wireless base station apparatus measures received power on the basis of this RACH.

Ordinarily, the RACH signal is transmitted from the mobile terminal device at a constant power. Therefore, the wireless base station can estimate a path loss (transmission loss) from the power received over this channel to estimate a power at which a signal should be transmitted from the wireless base station. This transmission power estimation can be performed with accuracy particularly in the case of the TDD method in which one frequency is used in a time division manner. It is also possible to estimate the transmission power from information including information on the location of the mobile terminal device. Grouping of users is performed by the values of transmission power estimated in this manner.

Grouping of users will be described with reference to FIG. 1. FIG. 1 illustrates a mobile terminal device 100, and a wireless base station apparatus 200. The mobile terminal device 100 shown in FIG. 1 transmits an upstream signal at a known transmission power. For example, the mobile terminal device 100 transmits an upstream signal known as a signal of a certain transmission power value. In actuality, the transmission power value of the above-mentioned RACH signal is known in a higher-level apparatus since the RACH signal is transmitted at a transmission power designated from the higher-level apparatus.

The wireless base station apparatus 200 shown in FIG. 1 receives the upstream signal through the receiving unit 201. A transmission loss estimation unit 202 computes a transmission loss on the basis of the value of the received power and the known transmission power value 203. In this case, the transmission loss can be computed by simply subtracting the received power value from the known transmission power value.

A transmission power estimation unit 204 then estimates a transmission power to be transmitted over a downstream channel on the basis of information including the transmission loss computed in the transmission loss estimation unit 202 and the ratio of a signal to be communicated and interference power (Signal to Interference Ratio: SIR) determined to ensure the required quality, which varies with respect to kinds of service 205. Kinds of service 205 are, for example, speech, integrated services digital network (ISDN), etc. The transmission power value thereby estimated may be used when transmission is actually performed.

A grouping unit 206 performs grouping of mobile terminal devices on the basis of downstream channel transmission power values estimated as described above. A priority setting unit 207 sets priorities for a plurality of wireless resources respectively. The operation for computation of the transmission loss and the other operations subsequent to the transmission loss computation operation may be performed in a higher-level controller instead of being performed in the wireless base station apparatus 200.

Figure 3:
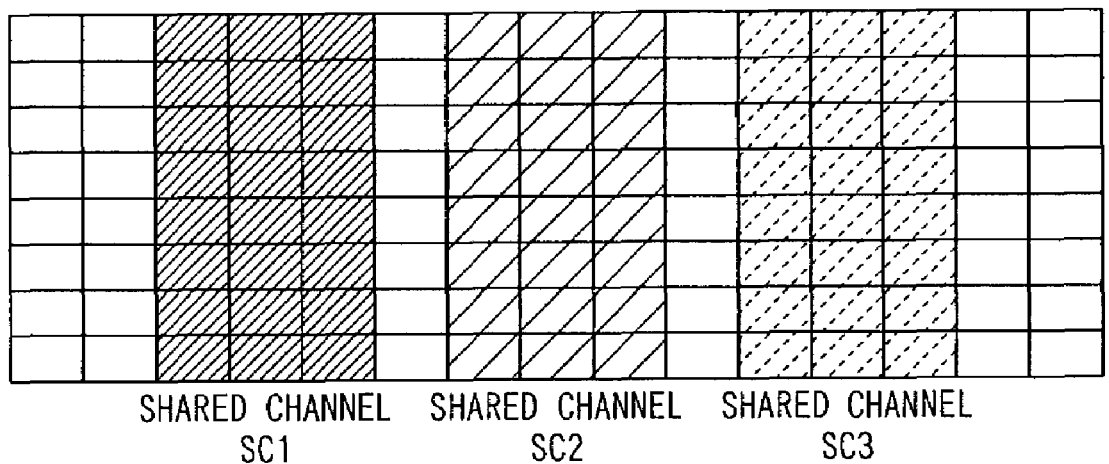
FIG. 3 is a diagram showing an example of setting of priorities for shared channels in correspondence with descending order of transmission power.

Each of a plurality of base stations determines channels for communication by selecting the wireless resources with the set priorities on the basis of the results of the above-described processing. More specifically, a plurality of time slots are defined as one shared channel, as shown in FIG. 3. Of the time slots shown in FIG. 3, three are used for one shared channel. That is, three time slots are assigned to each of a shared channel SC1, a shared channel SC2, and shared channel SC3 shown in FIG. 3.

Figure 4:
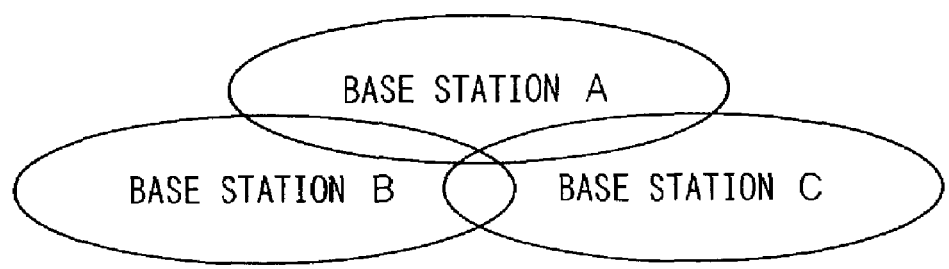
FIG. 4 is a diagram schematically showing a state where a plurality of base stations exist.
Figures 5, 6:
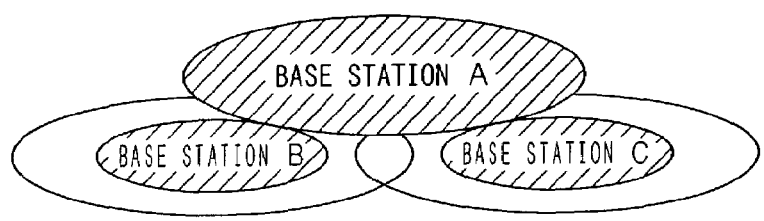
FIG. 5 is a diagram for explaining setting of priorities for a plurality of shared channels among a plurality of cells.
FIG. 6 is a diagram schematically showing communication areas formed by base station apparatuses with a shared channel SC1.

Each base station sets priorities for the plurality of shared channels SC1 to SC3 with respect to levels of transmission power. FIG. 4 schematically shows a state where a plurality of base stations A to C exist, and FIGS. 5 and 6 show priority setting in the base stations shown in FIG. 4. A case where the highest priority is set in correspondence with users with higher transmission power will be described by way of example. However, the arrangement may alternatively be such that the highest priority is set in correspondence with users with lower transmission power.

FIG. 4 shows an example of an omni-cell configuration in which one base station forms one area. However, it is apparent that the system of the present invention can also be used in a case where a sector configuration used in which the area of one base station is divided into a plurality sectors.

In this embodiment, grouping is performed as shown in FIG. 5. That is, the shared channel SC1 resource is assigned to users with higher transmission power in the area of the base station A. Similarly, the shared channel SC2 resource is assigned to users with higher transmission power in the area of the base station B, and the shared channel SC3 resource is assigned to users with higher transmission power similarly in the area of the base station C. That is, in the system of this embodiment, transmission to mobile terminal devices belonging to a group requiring higher transmission power in one of a plurality of cells adjacent to each other and transmission to mobile terminal devices belonging to a group requiring higher transmission power in another of the cells are performed at different times, thus limiting external interference power received in each cell.

FIG. 6 schematically shows communication areas formed by the base station apparatuses with the shared channel SC1. Referring to FIG. 6, with respect to the shared channel SC1, the transmission power from the base station apparatus A is higher than each of the transmission powers from the base station apparatuses B and C. In this embodiment, grouping of mobile terminals is performed with reference to two ranges of transmission power, i.e., a high range and a low range. Alternatively, grouping may be performed with reference to three or more ranges of transmission power. The system of the present invention can also be used in a case where one shared channel corresponds to one time slot.

Setting of priorities with respect to transmission power may be self-sustainingly performed in each base station or may be performed under centralized control in accordance with an external instruction from a higher-level controller, another base station, or the like. It is thought that centralized control from a controller higher in level than the base station is more advantageous in ordinary cases.

(Second Embodiment)

Figure 7:
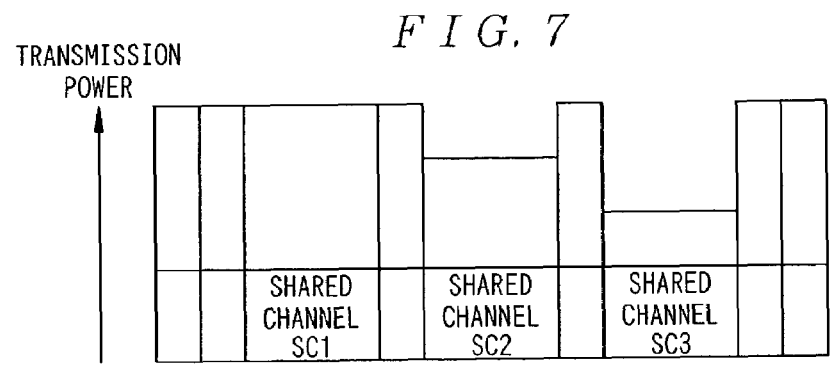
FIG. 7 is a diagram for explaining setting of transmission powers with respect to time slots or shared channels.

Next, a second embodiment of the present invention will be described. A wireless access method in this embodiment is assumed to be a combination of a CDMA method, a TDMA method and a TDD method, as is that in the first embodiment. In this embodiment, transmission power control of transmission over a downstream channel is not performed but transmission power is set to different levels with respect to time slots or shared channels. FIG. 7 shows an example of setting of transmission power to different levels with respect to time slots or shared channels.

Figure 8:
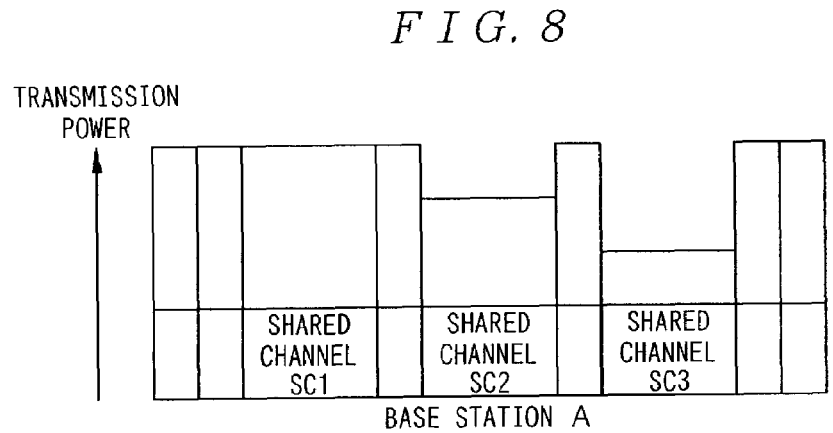
FIG. 8 is a diagram showing a relationship between transmission power and priorities when different transmission powers are set with respect to time slots or shared channels in a case where a plurality of base station apparatuses exist.

FIG. 8 shows a relationship between the transmission power and priorities in a case where a plurality of base stations exist in each of which a transmission power setting similar to that shown in FIG. 7 is made. As shown in FIG. 8, in the base station A, a highest level of transmission power is set for transmission over a shared channel SC1 in shared channels SC1 to SC3, while a lowest level of transmission power is set for transmission over the shared channel SC3. In the base station B, a highest level of transmission power is set for transmission over the shared channel SC2 in the shared channels SC1 to SC3, while a lowest level of transmission power is set for transmission over the shared channel SC1.

Furthermore, in the base station C, a highest level of transmission power is set for transmission over the shared channel SC3 in the shared channels SC1 to SC3, while a lowest level of transmission power is set for transmission over the shared channel SC2.

The transmission power estimation method and the user grouping method in this embodiment are the same as those in the first embodiment.

In this embodiment, the priorities are determined in advance by setting the levels of transmission power with respect to time slots or shared channels. Setting of the priorities may be automatically performed in each base station or may be performed under centralized control in accordance with an external instruction from a higher-level controller, as is that in the first embodiment.

(Method of Controlling Base Station Apparatus and Mobile Communication System)

As described above, the base station apparatus performs transmission power control with respect to downstream signals respectively transmitted to a plurality of mobile terminal devices, and includes transmission power estimation means for estimating transmission power necessary for transmission of the downstream signal to each mobile terminal device on the basis of an upstream signal from the mobile terminal device, and grouping means for performing grouping processing for dividing the plurality of mobile terminal devices into groups sharing a plurality of wireless resources according to the transmission powers estimated by the transmission power estimation means. The downstream signals to be transmitted to the mobile terminal devices belonging to each of the groups divided by the grouping means are transmitted simultaneously with each other. The transmission power estimation means receives signals transmitted at a known transmission power by the mobile terminal devices, measures transmission losses between the mobile terminal devices and the base station apparatus on the basis of the received signals, and estimates the transmission power necessary for transmission of the downstream signal to each mobile terminal device on the basis of the transmission loss and the kind of service offered. The apparatus further includes priority setting means for respectively setting priorities for the plurality of wireless resources. The mobile terminal devices belonging to the groups divided by the grouping means are assigned according to the priorities set by the priority setting means. The priority setting means may set the priorities in accordance with an instruction from an external apparatus.

A method of controlling a mobile communication system is also realized by the present invention, as described below. That is, a method of controlling a mobile communication system is realized which performs transmission power control with respect to downstream signals respectively transmitted from a base station apparatus to a plurality of mobile terminal devices. The method includes a transmission power estimation step of estimating transmission power necessary for transmission of the downstream signal from the base station apparatus to each mobile terminal device on the basis of an upstream signal from the mobile terminal device to the base station apparatus, and a grouping step of performing grouping processing for dividing the plurality of mobile terminal devices into groups sharing one or more wireless resources according to the transmission powers estimated in the transmission power estimation step. The downstream signals to be transmitted to users belonging to each of the groups divided in the grouping step are transmitted simultaneously with each other. Preferably, estimation of transmission power in the transmission power estimation step is performed in the base station apparatus, and grouping processing in the grouping step is performed in a controller higher in level than the base station apparatus.

In the transmission power estimation step, the base station apparatus receives signals transmitted at a known transmission power by the mobile terminal devices, measures transmission losses between the mobile terminal devices and the base station apparatus on the basis of the received signals, and estimates the transmission power necessary for transmission of the downstream signal to each mobile terminal device on the basis of the transmission loss and the kind of service offered.

The method further includes a priority setting step of respectively setting priorities for the plurality of wireless resources. The mobile terminal devices belonging to the groups divided in the grouping step are assigned according to the priorities set in this priority setting step.

In the priority setting step, the priorities may be set in accordance with an instruction from an external apparatus.

According to the present invention, as described above, necessary transmission powers are estimated, users are divided into groups, and signals are transmitted to each group simultaneously with each other. Therefore, in the case when the present invention is applied to a CDMA/TDMA/TDD system, interference power received in each cell from adjacent cells can be reduced, thereby enabling the received power for obtaining the required quality to be reduced. Consequently, there is such an effect that the transmission power can be limited.

Transmission losses are measured and the necessary transmission powers are estimated on the basis of the transmission losses and kinds of service offered, thereby effectively reducing interference power received in each cell from adjacent cells and limiting the transmission power.

Further, assignment according to priorities of resources to mobile terminal devices belonging to divided groups ensures that transmission to a group requiring higher transmission power in one of cells adjacent to each other and transmission to a group requiring higher transmission power in another of the cells are performed at different times, thus reducing interference power received in each cell from the adjacent cells. Consequently, there is such an effect that the received power for obtaining the required quality is reduced to limit the transmission power.

What is claimed is:

1. A mobile communication system comprising:
    transmission power estimation means for estimating transmission power necessary for transmission of a downstream signal from a base station apparatus to each of a plurality of mobile terminal devices on the basis of an upstream signal from the mobile terminal device to the base station apparatus; and
    grouping means for performing grouping processing for dividing the plurality of mobile terminal devices into groups sharing one or more wireless resources according to the transmission powers estimated by said transmission power estimation means,
    wherein one or more wireless resources are assigned according to the transmission power which is differentiated between base station apparatuses and consequently the transmission to mobile terminal devices belonging to a group requiring higher transmission power in one of a plurality of cells adjacent to each other and transmission to mobile terminal devices belonging to a group requiring higher transmission power in another of the cells are performed at different times.

2. The mobile communication system according to claim 1, wherein said transmission power estimation means receives signals transmitted at a known transmission power by the mobile terminal devices, measures transmission losses between the mobile terminal devices and the base station apparatus on the basis of the received signals, and estimates the transmission power necessary for transmission of the downstream signal to each mobile terminal device on the basis of the transmission loss and service offered.

3. The mobile communication system according to claim 1 or 2, further comprising priority setting means for setting priorities for one or more wireless resources, wherein the mobile terminal devices belonging to the groups divided by said grouping means are assigned according to the priorities set by said priority setting means.

4. The mobile communication system according to claim 3, wherein said priority setting means sets the priorities in accordance with an instruction from an external apparatus.

5. A base station apparatus which performs transmission power control with respect to downstream signals respectively transmitted to a plurality of mobile terminal devices, comprising:
    transmission power estimation means for estimating transmission power necessary for transmission of a downstream signal to each of the mobile terminal devices on the basis of an upstream signal from the mobile terminal device; and
    grouping means for performing grouping processing for dividing the plurality of mobile terminal devices into groups sharing one or more wireless resources according to the transmission powers estimated by said transmission power estimation means,
    wherein one or more wireless resources are assigned according to the transmission power which is differentiated between base station apparatuses and consequently the transmission to mobile terminal devices belonging to a group requiring higher transmission power in one of a plurality of cells adjacent to each other and transmission to mobile terminal devices belonging to a group requiring higher transmission power in another of the cells are performed at different times.

6. The base station apparatus according to claim 5, wherein said transmission power estimation means receives signals transmitted at a known transmission power by the mobile terminal devices, measures transmission losses between the mobile terminal devices and the base station apparatus on the basis of the received signals, and estimates the transmission power necessary for transmission of the downstream signal to each mobile terminal device on the basis of the transmission loss and service offered.

7. The base station apparatus according to claim 5 or 6, further comprising priority setting means for setting priorities to one or more wireless resources, wherein the mobile terminal devices belonging to the groups divided by said grouping means are assigned according to the priorities set by said priority setting means.

8. The base station apparatus according to claim 7, wherein said priority setting means sets the priorities in accordance with an instruction from an external apparatus.

9. A method of controlling a mobile communication system in which transmission power control is performed with respect to downstream signals respectively transmitted from a base station apparatus to a plurality of mobile terminal devices, comprising:
   a transmission power estimation step of estimating transmission power necessary for transmission of the downstream signal to each mobile terminal device on the basis of an upstream signal from the mobile terminal device to the base station apparatus; and
   a grouping step of performing grouping processing for dividing the plurality of mobile terminal devices into groups sharing one or more wireless resources according to the transmission powers estimated in said transmission power estimation step,
   wherein one or more wireless resources are assigned according to the transmission power which is differentiated between base station apparatuses and consequently the transmission to mobile terminal devices belonging to a group requiring higher transmission power in one of a plurality of cells adjacent to each other and transmission to mobile terminal devices belonging to a group requiring higher transmission power in another of the cells are performed at different times.

10. The method according to claim 9, wherein estimation of transmission power in said transmission power estimation step is performed in the base station apparatus, and grouping processing in said grouping step is performed in a controller higher in level than the base station apparatus.

11. The method according to claim 9 or 10, wherein, in said transmission power estimation step, the base station apparatus receives signals transmitted at a known transmission power by the mobile terminal devices, measures transmission losses between the mobile terminal devices and the base station apparatus on the basis of the received signals, and estimates the transmission power necessary for transmission of the downstream signal to each mobile terminal device on the basis of the transmission loss and service offered.

12. The method according to claim 9 or 10, further comprising a priority setting step of respectively setting priorities for the one or more wireless resources, wherein the wireless resources are assigned to the mobile terminal devices belonging to the groups divided in the grouping step according to the priorities set in said priority setting step.

13. The method according to claim 12, wherein, in said priority setting step, the priorities are set in accordance with an instruction from an external apparatus.

14. The method according to claim 11, further comprising a priority setting step of respectively setting priorities for the one or more wireless resources, wherein the wireless resources are assigned to the mobile terminal devices belonging to the groups divided in the grouping step according to the priorities set in said priority setting step.

15. The method according to claim 14, wherein, in said priority setting step, the priorities are set in accordance with an instruction from an external apparatus.

\* \* \* \* \*